United States Patent [19]

Klar et al.

[11] 4,420,336

[45] Dec. 13, 1983

[54] PROCESS OF IMPROVING CORROSION RESISTANCE IN POROUS STAINLESS STEEL BODIES AND ARTICLE

[75] Inventors: Erhard Klar, Beachwood; Mary A. Pao, Concord, both of Ohio

[73] Assignee: SCM Corporation, New York, N.Y.

[21] Appl. No.: 347,954

[22] Filed: Feb. 11, 1982

[51] Int. Cl.³ .............................................. B22F 1/00
[52] U.S. Cl. ..................................... 75/246; 428/566; 419/2; 419/57; 419/58
[58] Field of Search ...................... 428/566; 419/2, 38, 419/57, 58; 75/246

[56] References Cited

U.S. PATENT DOCUMENTS 3,425,813  2/1969  Orlemann ............................ 29/183.5
3,711,341  1/1973  Joshi et al. ................................. 419/2

FOREIGN PATENT DOCUMENTS 52-35708  9/1977  Japan .

OTHER PUBLICATIONS

Ro et al., Modern Developments in Powder Metallurgy, vol. 13, 1981, pp. 247–287, "Corrosion Behavior of P/M Austenitic Stainless Steels".
Stosuy et al., Metal Progress, May 1967, pp. 81–85, "Sintered Type 316L Stainless—Its Properties and Processing".
Dautzenberg, Proc. 2nd European Symposium on Powder Metallurgy May 8–10, 1968, Paper No. 6.18. "Eigenschaften von Sinterstahlen aus wasserverdusten unlegierten und fertiglegierten Pulvern".
Sanderow, 5th Internat. P/M Conf. 1976, "Stainless Steel P/M Alloys (Unique Applications)".
Lenel; F. V. *Powder Metallurgy Principles and Applications*, Metal Powder Industries Federation, Princeton, N.J., 1980, pp. 50–52.

*Primary Examiner*—Benjamin R. Padgett
*Assistant Examiner*—Matthew A. Thexton
*Attorney, Agent, or Firm*—R. A. Sturges; M. H. Douthitt

[57] ABSTRACT

A foraminous body formed of a tin-containing atomized, compacted and sintered austenitic stainless steel powder, and process including the steps of sintering and cooling in a dissociated ammonia atmosphere.

6 Claims, 1 Drawing Figure

PROCESS OF IMPROVING CORROSION RESISTANCE IN POROUS STAINLESS STEEL BODIES AND ARTICLE

This invention relates, as indicated, to a foraminous stainless steel body and a process for producing the same, and more particularly to a foraminous sintered powdered metal filter body of the types useful in the textile, food and chemical industries.

BACKGROUND OF THE INVENTION AND PRIOR ART

Past growth of conventional powder metal stainless steel depended greatly on the availability of stainless steel powders permitting the economic production of complex shapes with adequate mechanical properties and moderate corrosion resistance.

The current exclusive use of fully prealloyed water atomized stainless steel powders was preceded by the use of elemental powder blends and powders obtained through intergranular corrosion of sensitized or embrittled stainless steel sheets in the 40's and early 50's. With the improvement of the atomization process, atomized stainless steel powders became more popular, and chemical compositions were optimized mainly with respect to compacting properties. The two major improvements consisted of: (1) the lowering of the oxygen contents from typically over 5000 PPM to about 2000 PPM through the use of a protective atmosphere in the atomization chamber, a reduced superheat, and through proper balancing of the manganese and silicon contents; and (2) chemistry optimization of other constituents. Both measures improved green strength, compressability, and sintered properties of the powders.

The effects of sintering parameters, particularly sintering atmosphere, sintering temperature, and part density with respect to mechanical properties of sintered parts are well documented in the literature. (See: Stosuy, "Sintered Type 316 Stainless . . . Its Properties and Processing", Metal Progress 91, 1967, pp. 81-85.; Dautzenberg, "Eigenschaften von Sinterstaehlen aus wasserverduesten unlegierten und fertiglegierten Pulvern", Proc. 2nd European Symposium on Powder Metallurgy, May 8 to 10, 1968, paper No. 6.18.; Sanders, "Stainless Steel P/M Alloys—Unique Applications", 5th Int. P/M Conf. 1976.; Kato, "On Some Properties of Sintered Stainless Steels at Elevated Temperatures", Powder Metallurgy (Jap.) vol. 27, No. 5, 1980, pp. 2-8.

Until recently, studies on the corrosion resistance of conventional Powder Metallurgy (P/M) stainless steel parts were limited to questions dealing with the effects of processing, bulk chemistry modification, and post treatments, and use of higher alloyed compositions. In 1980, Ro and Klar (See: Ro and Klar, "Corrosion Behavior of P/M Austenitic Stainless Steels", Modern Developments in Powder Metallurgy, Vol. 13, 1981, pp. 247-287.) reported the surfaces of water atomized stainless powder to consist of silicon rich oxide film. While the presence of about 0.7% to 1.0% Si in typical stainless steel powders minimizes oxidation during atomization, thereby assuring good compacting characteristics, Ro and Klar found the presence of silicon rich oxide films very detrimental to corrosion resistance.

In tin-containing prealloyed stainless steel powders, they observed the surfaces of both powders and sintered parts to be highly enriched with tin which lead to improved corrosion resistance in highly compacted bodies. (Tin modified 304L parts showed less susceptibility to chrome nitride formation than regular 304L.).

The corrosion resistance of stainless steel powder metal parts, particularly low density porous metal parts, e.g., filters, is poor as compared to their wrought counterparts. One explanation for this behavior has been the inherent porosity of parts, which provides sites for crevice corrosion to occur. The presence of pores alone in powder metallurgy stainless steel parts cannot completely explain the inferior corrosion resistance, however, as evidenced by the fact that stainless parts processed and/or sintered under different conditions but having the same sintered density may have corrosion resistances differing by one to two orders of magnitude.

Another explanation is the metallurgical impact of the high-temperature sintering cycle which the part undergoes. There are several parts to this impact. The first concerns the 'sensitization' of the part by the precipitation of chromium carbides at the grain boundaries during cooling through the sensitization range of 1400° to 950° F. The region adjacent to the grain boundary is denuded by chromium by this carbide precipitation, and therefore, is susceptible to corrosion before the remainder of the part. This is the reason that powder metallurgy stainless powders are of the 'L' or low carbon grades, and are not sintered in carbon-containing atmospheres.

Sintering also reduces oxides from the original powder surfaces. Silicon oxides, which normally exist on water atomized powder surfaces, are broken during compaction of parts. The broken films may provide sites for crevice corrosion to initiate. It is believed that sintering in a reducing atmosphere causes partial removal of the fragmented films. The films may or may not be replaced by whole protective films. The degree to which oxide reduction occurs depends on the dewpoint, temperature, and reducing power (hydrogen partial pressure) of the sintering gas, as in a dissociated ammonia gas atmosphere.

It has been shown that the presence of tin in a stainless steel powder, either blended or prealloyed, leads to superior corrosion resistance of vacuum sintered parts (see Japanese Pat. No. 35708/1977 by Tatsua Hisada) and of parts sintered in hydrogen or dissociated ammonia (see 'Corrosion Behavior of P/M Austenitic Stainless Steels' by D. H. Ro and E. Klar (supra). Hisada explained the beneficial effect of tin as (1) heightening the corrosion resistance of the matrix alloy and (2) improving the compressibility of the powder. Ro and Klar, on the other hand, attributed the benefits of tin as the formation of chemically more stable passive films in a crevice.

It has now been shown that the tin effect is much more far reaching than previously believed. Parts of low carbon content are still susceptible to a sensitization phenomenon. This phenomenon is caused by the precipitation of chromium nitrides in the grain boundaries. The denuding of chromium adjacent to grain boundaries occurs just as in the carbide sensitization case.

The problems discussed above are particularly pronounced in connection with low density porous sintered stainless steel parts, e.g., filters, and as will be shown below the improvement in corrosion resistance obtained with tin and tin-copper alloys is unexpected under the circumstances. Although the invention is useful in all low density powdered stainless steel parts, it is of primary value in filter media of any size. These media have a density less than 80% of theoretical, and preferably less than 70% of theoretical where the sharply increased resistance to corrosion is clearly observed.

BRIEF STATEMENT OF THE INVENTION

Briefly stated, therefore, the present invention is in a fluid permeable porous or foraminous body formed from a tin-containing, atomized, compacted and sintered austenitic stainless steel powder. The powder is compacted to less than 80% of full density. The stainless steel powder is prealloyed or blended with from 0.1% to 10% by weight of tin. Copper may also be present in an amount ranging from 0.5 to 5% by weight. The invention is also in a process for making a sintered porous stainless steel compact wherein the steps of sintering and optionally cooling are carried out in a dissociated ammonia atmosphere.

DETAILED DESCRIPTION OF THE INVENTION

Figure 1:
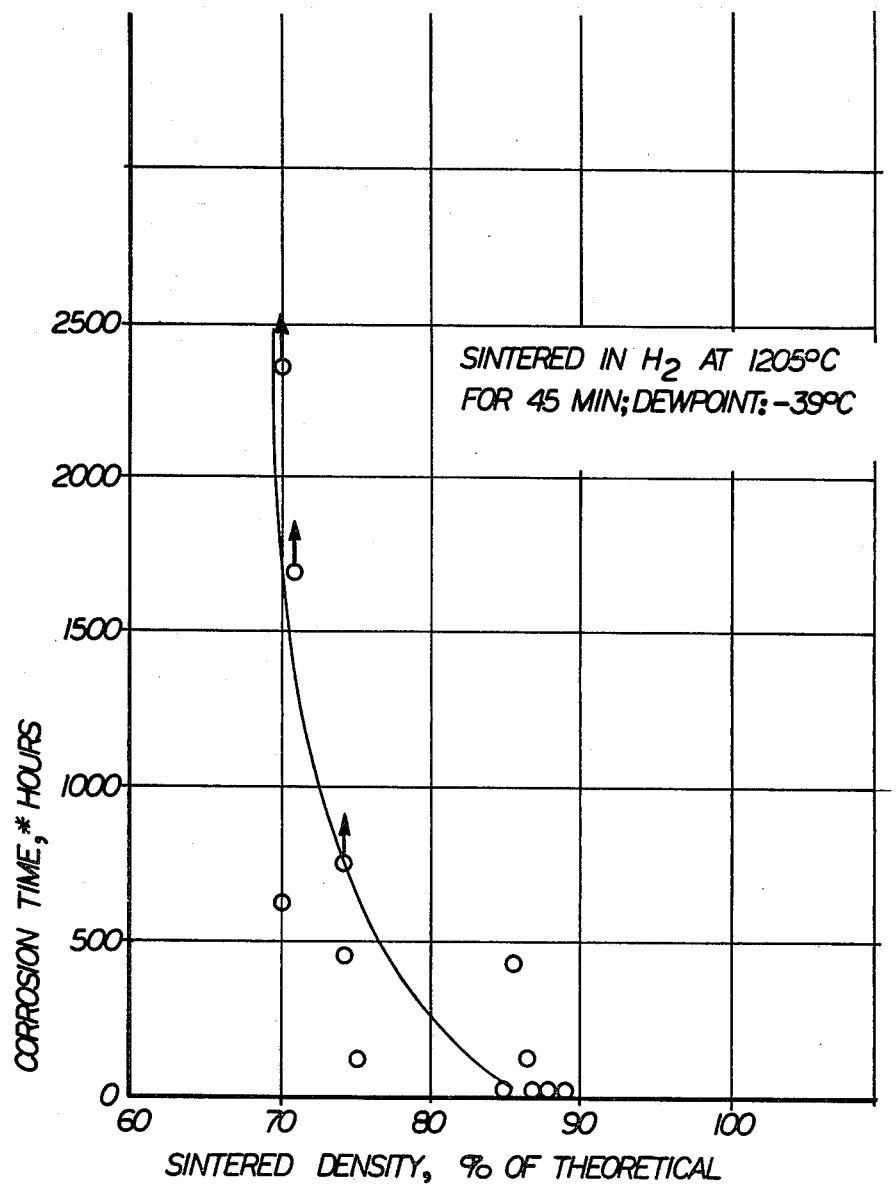
FIG. 1 is a graph showing the effect on corrosion time of decreasing density of tin containing stainless steel compacts sintered in hydrogen for comparative purposes.

As indicated above, the present invention is in a foraminous or low density compacted and sintered austenitic stainless steel powder in which the stainless steel is prealloyed with tin and atomized, or alternatively atomized and then physically blended with tin powder. Copper may optionally be included in the prealloy or blend.

The stainless steel powders used in this work had the following analyses: With two exceptions, powders with special chemistries were produced in 5 kg samples. The exceptions are the tin- and copper-containing powders in Table I. All samples were water-atomized in a nitrogen atmosphere.

Chemical analyses were run by X-ray and wet methods. Oxygen and nitrogen determinations were made on a Leco TC-36 gas analyzer.

TABLE I

CHEMICAL, PHYSICAL, COMPACTING AND SINTERING PROPERTIES OF REGULAR AND MODIFIED STAINLESS STEEL POWDERS

|  | 304L | 316L | 304LSC | 316LSC |
|---|---|---|---|---|
| Chromium, % | 18.3 | 16.8 | 18.5 | 16.3 |
| Nickel, % | 11.2 | 13.5 | 11.5 | 13.6 |
| Copper, % | — | — | 2.0 | 1.2 |
| Tin | — | — | 1.0 | 1.0 |
| Silicon | 0.97 | 0.8 | 0.9 | 0.8 |
| Manganese | 0.11 | | 0.15 | |
| Nitrogen | | | 0.04 | |
| Carbon | 0.024 | 0.16 | 0.015 | 0.018 |
| Phosphorus | | | 0.010 | |
| Sulfur | 0.012 | 0.018 | 0.015 | |
| Molybdenum | — | 2.1 | — | 2.2 |
| Iron | Balance | Balance | Balance | Balance |
| Apparent Density, g/cm$^3$ | 2.76 | 2.79 | 2.85 | 2.84 |
| Flow Rate 5/50 g | 27 | | 28 | |
| Sieve Analysis, Tyler, % | | | | |
| +100 mesh | 1.6 | 1.0 | 2.4 | 1.6 |
| −100 +150 mesh | 11.6 | 10.0 | 13.7 | 8.5 |
| −150 +200 mesh | 17.0 | 19.2 | 22.1 | 12.9 |
| −200 +325 mesh | 27.3 | 26.9 | 25.6 | 29.3 |
| −325 mesh | 42.9 | 42.9 | 36.2 | 47.7 |
| Green Density[1], g/cm$^3$ | 6.53 | 6.57 | 6.60 | 6.61 |
| Green Strength[1], N/mm$^2$ | 4.27 | 8.62 | 6.21 | 7.17 |
| Sintered[2], Transverse Rupture Strength, N/mm$^2$ | 772 | 841 | 793 | 889 |
| Ultimate Tensile Strength, N/mm$^2$ | 372 | | 358 | |
| Yield Strength (0.2%), N/mm$^2$ | 221 | | 276 | |
| Elongation in 25.4 mm, % | 3 | | 5.0 | |
| Dimensional Change, % (from die size) | −0.24 | −0.37 | −0.25 | −0.55 |

[1]552 MPa; 1% lithium stearate admixed.
[2]Sintered for 45 min. at 1150° C. in −40° C. dew point dissociated ammonia after lubricant burnoff in air.

Powders were compacted, using a double-acting die set, of 32×13 mm. Compressibility and green strength were determined for 15 g specimens with 1% lithium stearate added, compacted at a pressure of 552 MPa (40 TSI), and tested according to Metal Powder Industries Federation standard nos. 13–62 and 15.

Prior to sintering, lubricants were burned-off at 535° C. in air for 30 to 60 minutes.

Sintering was carried out in laboratory tube furnaces with water jacketed cooling zones, using various combinations of temperature, atmosphere, and dew point. Dew point was measured with an Alnor type 700 dew pointer, and controlled by drying with a dryerite column and a molecular sieve column in series.

Specimens were corrosion tested by total immersion in either a 5% aqueous NaCl solution or a 10% aqueous HNO$_3$ solution.

Corrosion in NaCl solution was evaluated in one of several ways. Where only one specimen per sample was tested, time until the first appearance of corrosion was recorded. Where more than one specimen per sample type was tested, one of the following determinations was made:

(1) Time to first sign of corrosion
(2) Time to 50% of parts with first sign of corrosion
(3) Time to 50% of parts with B rating or better
(4) Time to 90% of parts with B rating or better, where a 'B' rating refers to <1% of surface covered by stain.

Corrosion in HNO$_3$ solution was evaluated either by visual description, or by % weight loss from original, after rinsing with water, alcohol, and acetone and drying in a vacuum oven at ∼75° C.

It has been observed, without exception, that corrosion resistance improves with decreasing density. This is illustrated in FIG. 1. A water atomized 1.5% tin-containing powder was pressed to various densities and sintered in −39° C. dew point hydrogen at 1200° C. for 45 min. The theoretical density was assumed to be 8.02 g/cm$^3$. Corrosion testing was done by immersion in 5% aqueous solution of NaCl. Corrosion time is the time in hours at which corrosion first appears. Each experimental point is based on one specimen only. Points marked by arrows indicate minimum corrosion time as the corrosion test had been terminated without appearance of any corrosion.

As FIG. 1 shows, the improvement in corrosion resistance becomes very significant as the lower densities of below about 70% are approached. This effect is interpreted in terms of facilitated oxygen diffusion in the low density specimens with their larger pore sizes which retards oxygen depletion and acidification. In other words, if a part has to have pores, as necessitated by conventional powder metallurgy processing, it is better to make the pores as large as possible to admit oxygen and facilitate protective oxide formation.

The role of nitrogen is less clear. The main reason for this stems from the recognition that total nitrogen content alone is not a good criterion for assessing corrosion resistance. While investigations on nitrogen containing wrought stainless steels have shown that nitrogen contents of 0.2% produce superior pitting and crevice corrosion resistance provided the nitrogen is present in solution, problems arise when significant amounts of this nitrogen become converted to chrome nitride which in turn leads to chromium depletion, particularly in the grain boundaries. The tendency for this to occur increases with decreasing sintering temperature (as a consequence of increasing nitrogen solubility down to a temperature of about 1025° C. in dissociated ammonia), decreasing part density, facilitated absorption of nitrogen during cooling, decreasing cooling rate particularly between 70° and 1000° C., increasing chromium content, and increasing partial pressure of nitrogen, all of which increase the total nitrogen content. Published information shows the nitrogen solubility to exhibit a maximum which shifts to higher temperatures with increasing chromium content. This not only leads to higher nitrogen concentrations for higher Cr austenitic steels, but also to enhanced nitride formation during cooling, according to the equation $N+2Cr=Cr_2N$, as a result of the lower nitrogen solubility at the lower temperatures.

Further data on the effect of cooling rate, density, and composition are shown in Table II.

ammonia. Atmospheres equivalent to dissociated ammonia, e.g. synthetic nitrogen typically containing 2% to 10% hydrogen, with or without small amounts of carbon monoxide, balance nitrogen, may be used. Fast and slow cooling rates refer to the parts being pulled into the cool zone immediately after sintering, reaching room temperature within 10 minutes, and to the parts being left in the hot zone of the furnace with the temperature going from 1150° C. to 370° C. in just under 4 hours. The low density parts (5.0 g/cm$^3$), reflecting specific requirements for use in filter media applications. Corrosion testing was done in 10% nitric acid and in 5% aqueous NaCl. Sample size for each condition was 5 specimens. The results may be summarized as follows: Corrosion resistance improves with increasing cooling rate. Regular 316L is much more sensitive to cooling rate than tin modified grades. The lower density parts are much more corrosion resistant then the higher density parts. Both fast cooling and the presence of tin result in lower nitrogen contents.

Upon immersion into 10% nitric acid, the high density regular 316L parts began to turn dark almost immediately. The tin containing samples darkened only slightly or not at all. As some of the nitrogen figures of Table II show an unexpectedly large spread, some of the work was repeated using water quench after sintering as shown in Table III and data show much better uniformity close to the equilibrium values reported in the literature.

TABLE III

Nitrogen contents of parts sintered at two temperatures, then quenched in water.
Sintering atmosphere is D.A. with 38° C.
dew point. Green density is 5.0 g/cc. −325 mesh powder

TABLE II

Effect of Density, Cooling Rates and Composition on Corrosion Resistance of Austenitic Stainless Steels Sintering Temperature: 1150° C.
Sintering Atmosphere: Dissociated Ammonia (−43° C. Dew Point)
Sintering time: 45 minutes

| | | Green Density: 6.5 g/cm$^3$ (−100 mesh powder) Sintered Densities: 6.3 to 6.6 g/cm$^3$ | | Green Density: 5.0 g/cm$^3$ (−325 mesh powder) Sintered Densities: 5.1 to 5.2 g/cm$^3$ | | |
|---|---|---|---|---|---|---|
| | | | Corrosion Resistance | | Corrosion Resistance | |
| | Cooling Rate* | Nitrogen Content** ppm | Hours to 90% of specimens with 'B'-rating or better in 5% NaCl | Nitrogen Content** ppm | Hours to 90% of specimens with 'B'-rating or better in 5% NaCl | % Weight loss in 10% HNO$_3$ (1000 hrs.) |
| 316L | Slow | 5703(±2016) | .08 | 6767( ) | 1.0 | 4.29 |
| | Fast | 4017(±337) | .08 | 3801(±130) | 430 | .04 |
| 316L—1Sn | Slow | 3450(±200) | .2 | 3630(±9) | 350 | .45 |
| | Fast | 3428(±99) | 3.5 | 3753(±29) | 820 | .09 |
| 304LSC | Slow | 3945(+660) (−340) | .4 | 4206(±52) | 82 | .35 |
| (=304L—1Sn—2Cu) | Fast | 2822(+1356) (−897) | 1.5 | 3391(±54) | 630 | .21 |
| 316LSC | Slow | n.d. | n.d. | 3528( ) | 82 | .32 |
| (=316L—1Sn—2Cu) | Fast | n.d. | n.d. | 4039(±160) | 820 | .57 |

*The 'Fast cooled' parts were pulled into the water-jacketed cooling zone immediately after sintering and brought down to room temperature in 10 minutes; the 'slow cooled' parts were left in the furnace to cool from sintering temperature (1150° C.) to 370° C. in just under 4 hours, then fast cooled to room temperature.
**Nitrogen values fast averages of duplicate analyses performed on two or three different specimens. The bracketed values indicate the spread between low and high analyses.

In Table II, the conditions specified above columns 3 and 4 are typical for high density structural parts. The conditions specified above columns 6 and 7 are typical of those used to form the foraminous or porous bodies, e.g., filter media. Particle sizes ranging from two or three micrometers up to about 800 micrometers may be used.

Regular, tin-, and copper/tin modified powders were pressed to densities of 5.0 and 6.5 g/cm$^3$ and sintered at 1150° C. for 45 min. in −43° C. dew point dissociated

| | Sintering Temperature: | |
|---|---|---|
| | 1150° C. | 1260° C. |
| 316L | 3233(+177) (−154) | 2279(+158) (−228) |
| 316LSC | 3256(+173) (−234) | 2203(+159) (−211) |

The "fast" cooling rates in Table II lead to considerable nitrogen absorption during cooling. It is now believed that the large scatter of some of the nitrogen data of Table II originates with this phenomenon plus differences in cooling rate and nitrogen absorption due to mass effects and impaired nitrogen diffusion in between individual specimens, respectively.

Nitrogen content of regular and tin-bearing 316L is found to be identical and suggests that tin does not affect nitrogen stability, and that generally lower nitrogen values were found in tin-bearing materials of Table II and were the result of lower nitrogen absorption rates during cooling. The data also suggest that tin-bearing grades are less sensitive to slow cooling.

The relative insensitivity of the tin-containing materials to cooling rate has great practical significance since fast cooling rates are difficult to achieve in most industrial sintering furnaces. Thus, tin modified grades can provide superior corrosion resistance under common sintering conditions in nitrogen. This is of particular benefit if both good corrosion resistance and high strength from nitridation are sought.

The corrosion resistance of regular parts sintered in even at slow cooling rates. Tin modified parts were much less sensitive to cooling rate and showed superior corrosion resistance even at slow cooling rates. In both hydrogen and dissociated ammonia sintering atmospheres corrosion resistance increased with decreasing part density. Improved corrosion resistance is interpreted in terms of the removal and healing of fractured silicon rich oxide films and the supression of chrome nitride formation during cooling. In nitrogen containing sintering atmospheres the degree of chrome nitride formation appears to overshadow the effect of silicon rich oxide films.

The compacted and sintered tin-containing stainless steel of low density as described herein may be pickled in dilute aqueous nitric acid for electroplating or other plating, for example, with nickel to make further finished products, e.g., filter media.

What is claimed is:

1. A foraminous body having improved corrosion resistance to aqueous nitric acid, 10%, and being formed of tin-containing water atomized, compacted and sintered austenitic stainless steel alloy powder compacted and sintered to less than 80% of theoretical density and characterized by being formed of a prealloyed stainless steel alloy powder containing from 0.1% to 10% by weight of tin.

2. A foraminous body as defined in claim 1 wherein the stainless steel powder also contains copper.

3. A foraminous body as defined in claim 2 wherein the stainless steel powder contains about 1% tin and 2% copper.

4. A process for improving the corrosion resistance to aqueous nitric acid, 10%, of austenitic stainless steel foraminous body comprising:
(a) compacting water atomized austenitic stainless steel alloy powder in the form of said foraminous body and containing from 0.1% to 10% by weight of prealloyed tin to form a compact;
(b) sintering the compact in a dissociated ammonia or synthetic nitrogen atmosphere at a temperature of at least about 1125° C. to a final density less than 80% of theoretical density; and
(c) cooling the sintered compact in a dissociated ammonia atmosphere.

5. A process as defined in claim 4 additionally characterized by the step of pickling the foraminous body in dilute aqueous nitric acid.

6. A process for improving the corrosion resistance to aqueous nitric acid, 10%, of an austenitic stainless steel foraminous body comprising:
(a) compacting water atomized austenitic stainless steel alloy powder in the form of said foraminous body and containing from 0.1% to 10% by weight of prealloyed tin to form a compact;
(b) sintering the compact in a dissociated ammonia or synthetic nitrogen atmosphere at a temperature of at least about 1125° C. to a final density less than 80% of theoretical density; and
(c) cooling the sintered compact.

* * * * *